March 31, 1925.

E. A. SCHNUELLE

SURFACE CULTIVATOR

Filed Aug. 29, 1923

1,531,416

INVENTOR
Edward August
BY Schnuelle
Adam E. Fisher
ATTORNEY

Patented Mar. 31, 1925.

1,531,416

UNITED STATES PATENT OFFICE.

EDWARD AUGUST SCHNUELLE, OF SIDNEY, NEBRASKA.

SURFACE CULTIVATOR.

Application filed August 29, 1923. Serial No. 660,045.

*To all whom it may concern:*

Be it known that EDWARD AUGUST SCHNUELLE, a citizen of the United States, residing at Sidney, in the county of Cheyenne and State of Nebraska, has invented certain new and useful Improvements in Surface Cultivators, of which the following is a specification.

This invention relates to a surface cultivator for ploughed fields, and the object is to provide a relatively simple, efficient and practicable implement for use in cutting off weeds on ploughed fields and preparing the fields for the seeding and planting.

In the drawing

Figure 1:
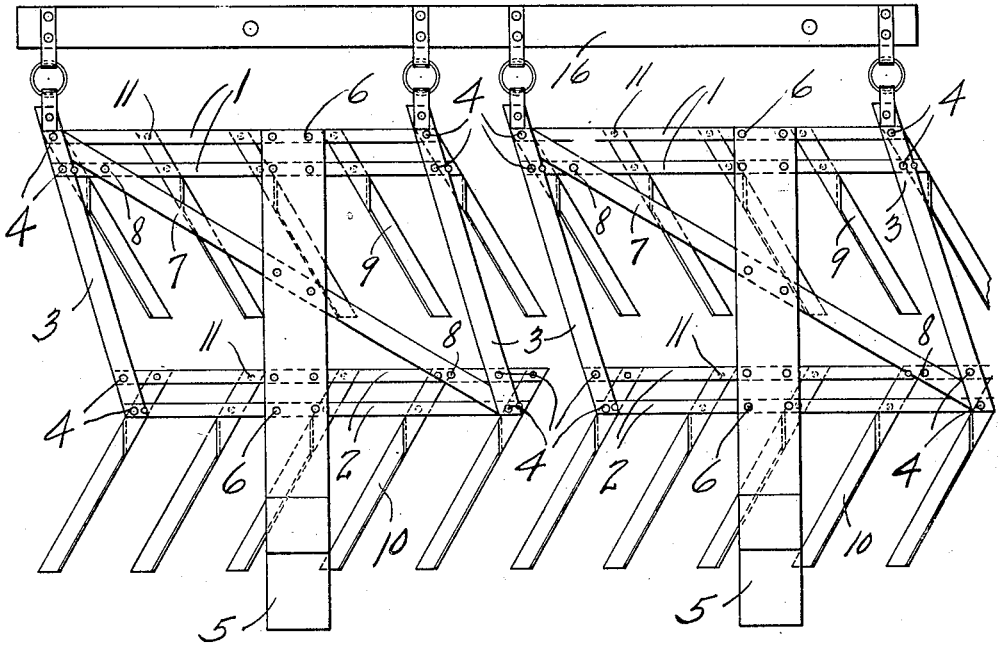
Figure 1 is a top plan view of the implement.
Figure 2:
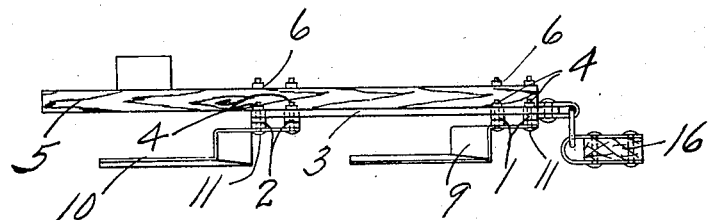
Figure 2 is a side elevation.
Figure 3:
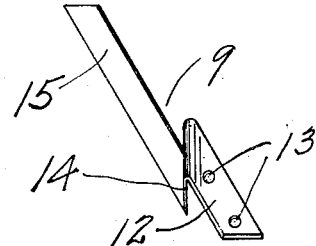
Figure 3 is a detail of one of the front knives.
Figure 4:
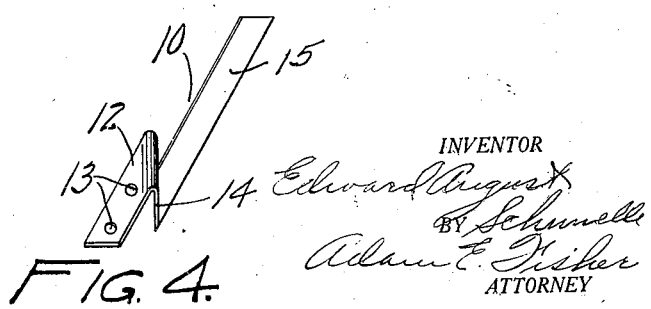
Figure 4 is a detail of one of the rear knives.

The invention consists of a set of front knife bars 1 and a set of rear knife bars 2 arranged transversely to the axis or proposed line of travel of the implement over the ground, and joined together by means of the end bars 3, which are bolted at 4 to the top sides of the said front and rear bars. Medially of the end bars are mounted weight beams 5, same being extended approximately parallel with the proposed line of travel, and being bolted at 6 to the front and rear bars. Braces 7 are extended diagonally between the front and rear knife bars 1 and 2, and are bolted thereto at the points 8. Bolted at 11 along the under sides of the front and rear bars 1 and 2, are a plurality of weed knives 9 and 10. These knives are of a peculiar shape as shown in Figures 3 and 4; being made of thin tempered steel and formed with shanks 12 pierced with bolt holes 13, whereby they are secured to the bars as stated; and having downwardly turned neck portions 14 and blades 15 with their planes extended substantially parallel to their shanks and to the plane of the implement, and askew from the longitudinal axis thereof. The front knives 9 are turned askew to one side and the rear knives 10 are turned to the opposite side and so that the back ends of the knives approximately meet or overlap on straight away or longitudinal lines. The cutting edges of the knives may be turned slightly downward, so as to pull the knives into the ground in operation. The usual draft apparatus 16 is attached to the front. Any required weight may be placed upon the weight beams 5 to assist in holding the implement to the ground, and these weights may be moved forward or backward as desired. While only two sets of apparatus are here shown, adapted to one team of horses, additional sets may be added if desired, and another team attached.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

A device of the kind described, comprising sets of transversely arranged front and rear knife bars; end bars connecting the knife bars; weight beams arranged medially of the end bars and secured to the front and rear knife bars; braces extended diagonally between and connecting the front and rear knife bars; weed knives secured to the under sides of the front and rear knife bars, the front knives being turned askew to one side and the rear knives being turned askew to the opposite side, and so that the back ends of the knives approximately meet on straight away longitudinal lines; and means for drawing the implement.

EDWARD AUGUST SCHNUELLE.

Witnesses:
F. N. HAWSON,
LENA L. JENSEN.